United States Patent [19]
Koike et al.

[11] Patent Number: 5,800,676
[45] Date of Patent: Sep. 1, 1998

[54] METHOD FOR MANUFACTURING A MINERAL FIBER PANEL

[75] Inventors: Kazuyoshi Koike, Chiba; Hidetoshi Kojima, Totsukaido, both of Japan

[73] Assignee: Nitto Boseki Co., Ltd., Fukushima, Japan

[21] Appl. No.: 916,360

[22] Filed: Aug. 22, 1997

[30] Foreign Application Priority Data

| Aug. 26, 1996 | [JP] | Japan | 8-241006 |
| Aug. 26, 1996 | [JP] | Japan | 8-241007 |
| Oct. 9, 1996 | [JP] | Japan | 9-285875 |

[51] Int. Cl.$^6$ ............................................. D21H 13/36
[52] U.S. Cl. .................. 162/145; 162/141; 162/152; 162/156; 162/168.1; 162/169; 264/42; 264/45.4; 264/86
[58] Field of Search ............................ 264/86, 45.4, 42; 162/145, 152, 156, 168.1, 169, 141

[56] References Cited

U.S. PATENT DOCUMENTS

| 3,556,934 | 1/1971 | Meyer | 162/169 |
| 3,941,634 | 3/1976 | Nisser et al. | 264/45.4 |
| 4,062,721 | 12/1977 | Guyer et al. | 162/145 |
| 4,126,512 | 11/1978 | Hill | 162/145 |
| 4,836,871 | 6/1989 | Kato | 264/45.4 |
| 5,047,120 | 9/1991 | Izard et al. | 162/152 |

*Primary Examiner*—James Derrington
*Attorney, Agent, or Firm*—Foley & Lardner

[57] ABSTRACT

A method for manufacturing a mineral fiber panel which comprises uniformly dispersing in water 60 to 90% by weight of a mineral fiber, 2 to 19% by weight of an organic binder, 1 to 20% by weight of an inorganic microfiber, 0.5 to 3% by weight of a flocculant and 0.5 to 10% by weight of a thermally expansible resin fine particle which has a diameter after expansion of not less than 0.03 mm but less than 3.0 mm, the expansion degree of the above diameter being at least 3 times, and which has an expansion-starting temperature of 50° to 105° C., as the composition components, to prepare a slurry, and thereafter subjecting the slurry to wet forming and then to drying. The above production process enables the enhancement of productivity and the mineral fiber panel obtained by the above production process is light in weight and excellent in sound-absorbing qualities and fireproof properties.

8 Claims, No Drawings

METHOD FOR MANUFACTURING A MINERAL FIBER PANEL

BACKGROUND OF THE INVENTION

This invention relates to a method for manufacturing a mineral fiber panel which comprises as the main component a mineral fiber such as slag wool or the like and which is light in weight and excellent in sound-absorbing qualities, fireproof properties and productivity.

A mineral fiber panel obtained by a wet or semi-wet production process using slag wool as the main component has been used mainly as an interior decoration material on the ceiling panel of a building. The properties required for the material are basically fireproof properties and sound-absorbing qualities. However, the latent problems include enhancement of execution efficiency, further enhancement of sound-absorbing qualities, reduction of transport cost from the viewpoint of economy, reduction of raw material cost, and enhancement of productivity. As a means for satisfying these requirements, the lightening of the weight of material can be considered. The density of the mineral fiber panel generally produced at present is about 400 kg/m$^3$; however, when it is intended to reduce the density to, for example, 200 to 300 kg/m$^3$ as the measure of lightening the weight for satisfying the above problems, it can be considered that a lightweight aggregate such as expanded pearlite, shirasu balloon or the like be blended in a high proportion. However, the blending of a lightweight aggregate such as expanded pearlite, shirasu balloon or the like in a high proportion may make the weight lighter and may slightly improve the sound-absorbing qualities; however, the water content including in the material after wet forming step is sharply increased and hence the energy for drying is sharply increased. In addition, the production speed downs sharply and as a result the cost increases, whereby most of the merit of lightening the weight is canceled.

In addition to the above-mentioned blending a lightweight aggregate, it can be considered to blend, in a high proportion, a mineral fiber having a high restoring properties; however, the mineral fiber having a high restoring properties is inferior in water-dispersibility and the density of the panel differs greatly from portion to portion and hence no mineral fiber panel satisfactory in both appearance and physical properties is obtained.

Moreover, a conventional method for imparting a design to a molded panel formed according to a wet production process includes roll embossing, roll fissure, roll press, sandblast three-dimensional processing and the like; however, all of them require a mechanical equipment and hence the step of imparting a design becomes a rate-determining step as to the productivity. The pattern becomes artificial and regular because it is made by a machine, and no natural feeling is obtained. Furthermore, patterns made by a roll or a sandblast are present only in the surface layer and hence when a three-dimensional processing is co-used, it is impossible to leave the pattern in the valley portion. Leaving the pattern over the whole layer of the raw material has been in fact impossible in the wet production process.

In addition, the conventional method of imparting sound-absorbing qualities has a problem of an increase of the number of steps and an adverse effect on the design because an addition of a pin hole or the like is required.

SUMMARY OF THE INVENTION

An object of this invention is to provide, in order to solve the above-mentioned latent problems, a process for producing a mineral fiber panel which is light in weight and excellent in sound-absorbing qualities, fireproof properties and productivity, and particularly to lighten the weight of the mineral fiber panel so that its density is reduced to about 200 to 300 kg/m$^3$, preferably about 140 to 160 kg/m$^3$ (as aforesaid, the density of the mineral fiber panel generally produced at present is about 400 kg/m$^3$.).

Another object of this invention is to impart a natural concave-convex pattern to a mineral fiber panel without mechanical processing unlike the conventional patterning by a mechanical processing.

That is to say, the gist of this invention is a process for producing a mineral fiber panel which comprises uniformly dispersing in water 60 to 90% by weight of a mineral fiber, 2 to 19% by weight of an organic binder, 1 to 20% by weight of an inorganic microfiber, 0.5 to 3% by weight of a flocculant and 0.5 to 10% by weight of thermally expansible resin fine particles which has a diameter after expansion of 0.03 to 3.0 mm, the expansion degree of the above diameter being at least 3 times, and which has an expansion-starting temperature of 50° to 105° C., as the composition components to prepare a slurry, subjecting the slurry to wet forming and drying.

DETAILED DESCRIPTION OF THE INVENTION

The mineral fiber used in this invention is slag wool, rock wool or the like and is used in an amount of 60 to 90% by weight. When the amount is less than 60% by weight, it follows that the amount of the organic components increases correspondingly, and hence, a problem is caused in fireproof properties. When the amount is more than 90% by weight, it follows that the amount of the organic components decreases correspondingly, and the strength becomes insufficient. In particular, when the object is to lighten the weight of the mineral fiber panel so that its density becomes about 140 to 160 kg/m$^3$, it is necessary that the amount of the mineral fiber used be controlled to 70 to 90% by weight. When the amount is less than 70% by weight, it follows that the amount of the organic components increases correspondingly, and a problem is caused in fireproof properties. When the amount is more than 90% by weight, it follows that the amount of the organic component decreases correspondingly, and the strength becomes insufficient.

The organic binder used in this invention is a resin, starch, a beaten pulp or the like and used in an amount of 2 to 19% by weight for bonding such components as mineral fiber and the like. When the amount is less than 2% by weight, the organic binder is lacking in the force for bonding the mineral fibers and a problem is caused in the maintenance of strength of mineral fiber panel. When the amount exceeds 19% by weight, the mineral fiber panel cannot clear quasi-noncombustibility as to fireproof properties, so that the upper limit of the amount of the organic binder becomes 19% by weight.

In particular, when the object is to lighten the weight of the mineral fiber panel so that its density becomes about 140 to 160 kg/m$^3$, it is necessary to use as the organic binder 0.5 to 5% by weight of a beaten pulp and 1.5 to 8% by weight of a completely saponified polyvinyl alcohol. The beaten pulp acts as a material for homogenizing the slurry dispersion, a material for enhancing the retention and a binding material, and when the amount is less than 0.5% by weight, the above-mentioned actions are not exerted, and when the amount is more than 5% by weight, the expansion of the thermally expansible resin fine particle is inhibited, resulting in a deterioration of fireproof properties. The completely saponified polyvinyl alcohol acts as a main binding material and when the amount is less than 1.5% by weight, the strength becomes insufficient, and when the amount is more than 8% by weight, the fireproof properties is deteriorated and the quasi-noncombustibility becomes impossible to clear. The reason for using the completely saponified polyvinyl alcohol is to prevent the agglomeration and sticking phenomenon. The completely saponified polyvinyl alcohol is swollen with and dissolved in hot water to be converted to a transparent liquid; however, in the wet mat formed by wet forming, it is considered that in view of the water content, the completely saponified polyvinyl alcohol be present in such a state as to correspond to an aqueous solution having a concentration of at least 10% by weight. However, the completely saponified polyvinyl alcohol has a sufficient fluidity compared with the starch having the same concentration as that polyvinyl alcohol and hence does not prevent the expansion phenomenon of the thermally expansible resin fine particle. Accordingly, the expansion is more increased, so that the density can be reduced as compared with a conventional starch-based adhesive.

The inorganic microfiber used in this invention includes sepiolite, attapulgite and the like and acts as a material for enhancing the retention of the organic binder and thermally expansible resin fine particle and contributes in itself as a fixing agent to the enhancement of strength characteristics. The amount of the inorganic microfiber used is 1 to 20% by weight. When the amount is less than 1% by weight, the effect of enhancing the retention and strength characteristics is insufficient, and when the amount exceeds 20% by weight, it follows that the content of the mineral fiber which is the main starting material is reduced and the density becomes high, so that the production speed is lowered by the deterioration of drainage in the wet forming step. Therefore, it is not desirable.

In particular, when the object is to lighten the weight of the mineral fiber panel so that its density becomes about 140 to 160 kg/m$^3$, the inorganic microfiber is used in an amount of 1 to 10% by weight. When the amount exceeds 10% by weight, the expansion of the thermally expansible resin fine particle is inhibited, and furthermore, when the amount exceeds 20% by weight, the deterioration of drainage in the wet forming step becomes remarkable and the proportion of the mineral fiber decreases relatively, and consequently, the density tends to increase.

The flocculant used in this invention includes polyacrylamide, a modified polyacrylamide, aluminum sulfate and the like and is used in an amount of 0.5 to 3% by weight. When the amount is less than 0.5% by weight, no sufficient effect of the flocculent is obtained and even if the amount is increased to more than 3% by weight, a further enhancement of the effect is not seen.

The thermally expansible fine particle used in this invention is a fine particle in which at least one foaming agent such as propane, butane, pentane, isobutane or the like is incorporated into a resin such as a polystyrene, polyethylene, polypropylene, a copolymer of acrylonitrile and vinylidene chloride, an ethylene-vinyl acetate copolymer or the like. Among the above-mentioned thermally expansible resin fine particles, those which have a diameter after expansion of 0.03 to 3.0 mm, the expansion degree of the above diameter being at least 3 times and which have an expansion-starting temperature of 50° to 105° C. are used. The reason why the diameter after expansion is 0.03 to 3.0 mm is that when the above diameter is less than 0.3 mm, the resin fine particles are retained in the voids of the configuration composed mainly of the mineral fibers and hence do not exhibit their effect of increasing the thickness of the mineral fiber panel. When the above diameter exceeds 3.0 mm, the configuration of the panel becomes rough and the strength and hardness of the mineral fiber panel become insufficient.

Particularly, when the object is to impart a natural concave-convex pattern without mechanical processing, it is necessary that the diameter after expansion be adjusted to 1.0 to 3.0 mm. When the diameter after expansion is less than 1.0 mm, the formation of a vermicular pattern in which the natural concave-convex pattern is good is insufficient. The reason why the expansion degree of the diameter after expansion is at least 3 times is that it is necessary for obtaining a sufficient effect of the lightening of the weight of the mineral fiber panel. The reason why the expansion-starting temperature is 50° to 105° C. is that the expansion at room temperature must be avoided and it is preferable that the expansion both starts and terminates before the hardening of the organic binder starts.

The amount of the thermally expansible resin fine particle used is 0.5 to 10% by weight. When the amount is less than 0.5% by weight, a sufficiently light weight is not obtained and when the amount exceeds 10% by weight, there are caused problems, such as fluctuation of properties with the inhomogeneity of the thermally expansible resin fine particle, irregularities of the panel surface, low strength, deterioration of fireproof properties and the like, in the mineral fiber panel.

In particular, when the object is to lighten the weight of the mineral fiber panel so that its density becomes about 140 to 160 kg/cm$^3$, the completely saponified polyvinyl alcohol which is greatly exothermic in combustion is used as an adhesive, so that it is necessary to adjust the amount of the thermally expansible resin fine particle used to 0.5 to 6% by weight. When the amount exceeds 6% by weight, the fireproof properties are deteriorated and it becomes impossible to clear the quasi-noncombustibility. Moreover, when the object is to impart a natural concave-convex pattern to the mineral fiber panel without mechanical processing, the amount of the thermally expansible fine particle used is preferably adjusted to 0.5 to 7% by weight. When the amount exceeds 7% by weight, such problems as fluctuation of properties, low strength and the like are caused in the mineral fiber panel. The thermally expansible resin fine particle used in this invention is an unfoamed fine particle when present in the starting slurry, and has a specific gravity in the vicinity of 1.0, so that it is easily and uniformly dispersed in the slurry and does not cause density mottle in the product. After the slurry has been subjected to wet forming and then cut to a mat form, the thermally expansible resin fine particle is heated in the drying step to reach the expansion temperature, upon which it starts to expand, whereby the thickness of the mat is increased. The expansion both starts and terminates before the hardening of the binder blended starts. When all of the water content in the mat has been evaporated, the mat becomes substantially dry and the setting of the binder is substantially terminated. The temperature of the mat further elevates, but the resin fine particle expanded in this course reaches its own melting point. At that point, the expanded fine particle foam is melt-broken, whereby the volume of the fine particle is returned to the volume before the expansion, and after the drying, the fine particle acts as a part of the binder. The void formed by the thermally expanded resin fine particle remains as it is and efficiently serves as a weight-lightening effect, a sound-absorbing effect and a heat-insulating effect.

The thickness of the mat before expansion is 1/3 to 2/3 of the conventional one (prepared by the conventional method), so that the drainage is enhanced, resulting in an improvement in wet forming speed, and the amount of water brought in the drying oven becomes 1/3 to 2/3 of the conventional one to shorten drying time and decrease amounts of fuel used.

The mineral fiber panel of this invention is prepared as follows: In the blending step, the mineral fiber, the organic binder, the inorganic microfiber, the flocculant and the thermally expansible resin fine particle are introduced in the given amounts into and uniformly dispersed in water to obtain a slurry comprising the above components in a total amount of about 5%. The slurry is dehydrated in the wet forming step to produce a wet mat. After that the wet mat is cut to the given size and then dried and hardened to obtain the original panel. The original panel is subjected to rough cutting and, if necessary, surface-planing and then, if necessary, to at least one processing selected from embossing by roll, edge-processing for panel edge finish and coating to obtain a final product.

DESCRIPTION OF THE PREFERRED EMBODIMENTS

EXAMPLES 1 TO 5

Each of the components shown in Table 1 was introduced into water in the blending proportion shown in Table 1 and uniformly dispersed in water to obtain a slurry comprising the above components in a total amount of 5% by weight. The slurry was subjected to wet forming by means of a Fourdrinier forming machine and then to drying and hardening to obtain the mineral fiber panels of this invention.

COMPARATIVE EXAMPLES 1 TO 5

Each of the components shown in Table 1 was introduced into water in the blending proportion shown in Table 1 and uniformly dispersed in water to obtain a slurry comprising the above components in a total amount of 5% by weight. The slurry was subjected to wet forming by means of a Fourdrinier forming machine and then to drying and hardening to obtain mineral fiber panels for comparison.

The wet forming property in each of Examples 1 to 5 and Comparative Examples 1 to 5 and the physical properties of the mineral fiber panels obtained were measured and the results obtained are shown in Table 1.

With reference to the physical properties shown in Tables 1–3, flexural load at break, sound absorption coefficient and fireproof properties were measured according to the methods of JIS A 1408, JIS A 1409 and notification Nos. 1231 and 1828 of the Ministry of Construction respectively.

TABLE 1

| Example (Ex.) & Comparative Example (Comp.) | | | Ex. 1 | Ex. 2 | Ex. 3 | Ex. 4 | Ex. 5 |
|---|---|---|---|---|---|---|---|
| Blending proportion of each component (solids %) | Styrene type thermally expansible resin (%) | Expanded dia. (mm) | — | — | 1 | 0.5 3 | 0.8 — |
| | | Dia. expansion (times) | | | 5 | 5 | |
| | | Expansion temp. (°C.) | | | 80 | 90 | |
| | Acrylonitrile-vinylidene chloride type thermally expansible resin (%) | Expanded dia. (mm) | 1 0.2 | 3 0.1 | — | — | 7 0.1 |
| | | Dia. expansion (times) | 10 | 3 5 | | | 3 |
| | | Expansion temp. (°C.) | 80 | 100 | | | 100 |
| | Slag wool (%) | | 85.5 | 83.5 | 85.5 | 83.5 | 79.5 |
| | Starch (%) | | 5 | 5 | 5 | 5 | 5 |
| | Pulp (%) | | 2 | 2 | 2 | 2 | 2 |
| | Attapulgite (%) | | 5 | 5 | 5 | 5 | 5 |
| | Pearlite (%) | | | | | | |
| | Polyacrylamide (%) | | 0.5 | 0.5 | 0.5 | 0.5 | 0.5 |
| | Aluminum sulfate (%) | | 1.0 | 1.0 | 1.0 | 1.0 | 1.0 |
| Wet forming property Physical properties | Water content after wet forming (dry base %) | | 95 | 95 | 95 | 95 | 95 |
| | Thickness after wet forming (mm) | | 12.5 | 10.4 | 12.1 | 9.6 | 7.9 |
| | Thickness after drying (mm) | | 15 | 15 | 15 | 15 | 15 |
| | Density after drying (kg/m³) | | 300 | 250 | 290 | 230 | 190 |
| | Flexural load at break (kgf, No. 5 test specimen) | | 27 | 25 | 27 | 25 | 25 |
| | Line speed index | | 160 | 190 | 165 | 205 | 240 |
| | Sound absorption coefficient (NRC) | | 0.59 | 0.59 | 0.61 | 0.75 | 0.75 |
| | Appearance | | Good | Good | Good | Good | Good |
| | Fireproof properties | | Noncombustible | Quasi-noncombustible | Noncombustible | Quasi-noncombustible | Quasi-noncombustible |

| Example (Ex.) & Comparative Example (Comp.) | | | Comp. 1 | Comp. 2 | Comp. 3 | Comp. 4 | Comp. 5 |
|---|---|---|---|---|---|---|---|
| Blending proportion of each component (solids %) | Styrene type thermally expansible resin (%) | Expanded dia. (mm) | — | 0.3 0.8 | — | — | |
| | | Dia. expansion (times) | | 3 | | | |
| | | Expansion temp. (°C.) | | 90 | | | |
| | Acrylonitrile-vinylidene chloride type thermally | Expanded dia. (mm) | 3 0.02 | — | 15 0.1 | — | |
| | | Dia. expansion (times) | 10 | | 3 | | |
| | | Expansion temp. (°C.) | 80 | | 100 | | |

TABLE 1-continued

|  |  | | | | | |
|---|---|---|---|---|---|---|
|  | expansible resin (%) | | | | | |
|  | Slag wool (%) | 83.5 | 86.2 | 71.5 | 46.5 | 86.5 |
|  | Starch (%) | 5 | 5 | 5 | 5 | 5 |
|  | Pulp (%) | 2 | 2 | 2 | 2 | 2 |
|  | Attapulgite (%) | 5 | 5 | 5 | 5 | 5 |
|  | Pearlite (%) | | | | 40 | |
|  | Polyacrylamide (%) | 0.5 | 0.5 | 0.5 | 0.5 | 0.5 |
|  | Aluminum sulfate (%) | 1.0 | 1.0 | 1.0 | 1.0 | 1.0 |
| Wet forming property | Water content after wet forming (dry base %) | 95 | 95 | 88 | 300 | 95 |
|  | Thickness after wet forming (mm) | 15 | 15 | 5 | 15 | 15 |
| Physical properties | Thickness after drying (mm) | 15 | 15 | 15 | 15 | 15 |
|  | Density after drying (kg/m$^3$) | 360 | 360 | 120 | 270 | 360 |
|  | Flexural load at break (kgf, No. 5 test specimen) | 33 | 30 | 15 | 22 | 30 |
|  | Line speed index | 100 | 100 | 270 | 45 | 100 |
|  | Sound absorption coefficient (NRC) | 0.48 | 0.48 | 0.75 | 0.52 | 0.48 |
|  | Appearance | Good | Good | Large Unevenness | Good | Good |
|  | Fireproof properties | Quasi-noncombustible | Noncombustible | Combustible | Noncombustible | Noncombustible |

EXAMPLES 6 TO 8

Each of the components shown in Table 2 was introduced into water in the blending proportion shown in Table 2 and uniformly dispersed in water to obtain a slurry comprising the above components in a total amount of 5% by weight. The slurry was subjected to wet forming by means of a Fourdrinier forming machine and then to drying and hardening to obtain the mineral fiber panels of this invention.

the above components in a total amount of 5% by weight. The slurry was subjected to wet forming by means of a Fourdrinier forming machine, and then to drying and hardening to obtain mineral fiber panels for comparison.

The wet forming property in each of Examples 6 to 8 and Comparative Examples 6 to 9 and the physical properties of the mineral fiber panels obtained were measured and the results obtained are shown in Table 2.

TABLE 2

| | | | Example 6 | Example 7 | Exampled 8 | Comp. Ex. 6 | Comp. Ex. 7 | Comp. Ex. 8 | Comp. Ex. 9 |
|---|---|---|---|---|---|---|---|---|---|
| Blending proportion of each component (solids %) | Styrene type thermally expansible resin (%) | Expanded dia. (mm) | 3   0.8 | 3   0.8 | 5   0.8 | 3   0.8 | 3   0.8 | 3   0.8 | |
|  |  | Dia. expansion (times) | 5 | 5 | 5 | 5 | 5 | 5 | |
|  |  | Expansion temp. (°C.) | 90 | 90 | 90 | 90 | 90 | 90 | |
|  | Slag wool (%) | | 85.0 | 83.5 | 82.0 | 83.5 | 77.5 | 73.5 | 86.5 |
|  | Completely saponified polyvinyl alcohol (%) | | 2.5 | 5 | 3.5 | — | 5 | 5 | — |
|  | Beaten Pulp (%) | | 3 | 2 | 3 | 2 | 8 | 2 | 2 |
|  | Attapulgite (%) | | 5 | 5 | 5 | 5 | 5 | 15 | 5 |
|  | Polyacrylamide (%) | | 0.5 | 0.5 | 0.5 | 0.5 | 0.5 | 0.5 | 0.5 |
|  | Aluminum sulfite (%) | | 1.0 | 1.0 | 1.0 | 1.0 | 1.0 | 1.0 | 1.0 |
|  | Starch (%) | | — | — | — | 5 | — | — | 5 |
| Wet forming property | Water content after wet forming (dry base %) | | 95 | 95 | 95 | 95 | 95 | 95 | 95 |
|  | Thickness after wet forming (mm) | | 6.7 | 6.7 | 5.8 | 9.6 | 11 | 11.5 | 15 |
| Physical properties | Thickness after drying (mm) | | 15 | 15 | 15 | 15 | 15 | 15 | 15 |
|  | Density after drying (kg/m$^3$) | | 160 | 160 | 140 | 230 | 260 | 280 | 360 |
|  | Flexural load at break (kgf, No. 5 test specimen) | | 20 | 25 | 20 | 25 | 30 | 27 | 30 |
|  | Line speed index | | 295 | 295 | 340 | 205 | 180 | 245 | 100 |
|  | Sound absorption coefficient (NRC) | | 0.85 | 0.85 | 0.85 | 0.75 | 0.75 | 0.70 | 0.48 |
|  | Appearance | | Good | Good | Good | Good | Good | Good | Good |
|  | Fireproof properties | | Noncombustible | Quasi-noncombustible | Quasi-noncombustible | Quasi-noncombustible | Quasi-noncombustible | Quasi-noncombustible | Noncombustible |

COMPARATIVE EXAMPLES 6 TO 9

Each of the components shown in Table 2 was introduced into water in the blending proportion shown in Table 2 and uniformly dispersed in water to obtain a slurry comprising

EXAMPLES 9 TO 14

Each of the components shown in Table 3 was introduced into water in the blending proportion shown in Table 3 and uniformly dispersed in water to obtain a slurry comprising the above components in a total amount of 5% by weight. The slurry was subjected to wet forming by means of a Fourdrinier forming machine and then to drying, hardening, surface-planing and decorative planing to obtain the mineral fiber panels of this invention.

COMPARATIVE EXAMPLES 10 AND 11

Each of the components shown in Table 3 was introduced into water in the blending proportion shown in Table 3 and uniformly dispersed in water to obtain a slurry comprising the above components in a total amount of 5% by weight. The slurry was subjected to wet forming by means of a Fourdrinier forming machine, and then to drying, hardening, surface-planing and decorative planing to obtain mineral fiber panels for comparison.

The paper-making property in each of Examples 9 to 14 and Comparative Examples 10 to 11 and the physical properties of the mineral fiber panels obtained were measured and the results obtained are shown in Table 3.

In Table 2, the density after drying is 140 to 160 kg/m$^3$, which achieves the target value of not more than 180 kg/m$^3$, namely the object of lightening the weight of the mineral fiber panel, and the sound absorption coefficient is 0.85, from which a sufficient effect is also seen.

In Table 3, the density after drying is 180 to 280 kg/m$^3$, which achieves the object of lightening the weight of the mineral fiber panel, and the sound absorption coefficient is 0.60 to 0.75, from which a sufficient effect is also seen. Furthermore, the important object of this invention that a natural concave-convex pattern is imparted without mechanical processing, has been sufficiently achieved.

What is claimed is:

1. A method for manufacturing a mineral fiber panel which comprises uniformly dispersing in water as composition components, 60 to 90% by weight of a mineral fiber, 2 to 19% by weight of an organic binder, 1 to 20% by weight of an inorganic microfiber, 0.5 to 3% by weight of a flocculant and 0.5 to 10% by weight of thermally expansible resin fine particles which have a diameter after expansion of

TABLE 3

|  |  |  | Example 9 | Example 10 | Example 11 | Example 12 | Comp. Ex. 10 | Example 13 | Comp. Ex. 11 | Example 14 |
|---|---|---|---|---|---|---|---|---|---|---|
| Blending proportion of each component (solids %) | Styrene type thermally expansible resin (%) | Expanded dia. (mm) | 5  1.0 | 3  1.5 | 2  2.0 | 1  2.5 |  | 5  0.5 | 1  4.0 | 10  2.0 |
|  |  | Dia. expansion (times) | 5 | 4 | 3 | 3 |  | 5 | 3 | 3 |
|  |  | Expansion temp. (°C.) | 90 | 90 | 90 | 90 |  | 90 | 90 | 90 |
|  | Slag wool (%) |  | 81.5 | 83.5 | 84.5 | 85.5 | 86.5 | 81.5 | 85.5 | 73.5 |
|  | Starch (%) |  | 5 | 5 | 5 | 5 | 5 | 5 | 5 | 8 |
|  | Pulp (%) |  | 2 | 2 | 2 | 2 | 2 | 2 | 2 | 2 |
|  | Attapulgite (%) |  | 5 | 5 | 5 | 5 | 5 | 5 | 5 | 5 |
|  | Polyacrylamide (%) |  | 0.5 | 0.5 | 0.5 | 0.5 | 0.5 | 0.5 | 0.5 | 0.5 |
|  | Aluminum sulfite (%) |  | 1.0 | 1.0 | 1.0 | 1.0 | 1.0 | 1.0 | 1.0 | 1.0 |
| Wet forming property | Water content after wet forming (dry base %) |  | 95 | 95 | 95 | 95 | 95 | 95 | 95 | 95 |
|  | Thickness after wet forming (mm) |  | 7.5 | 8.3 | 9.6 | 11.7 | 15 | 10 | 10.8 | 5.4 |
| Physical properties | Thickness after drying (mm) |  | 15 | 15 | 15 | 15 | 15 | 15 | 15 | 15 |
|  | Density after drying (kg/m$^3$) |  | 180 | 200 | 230 | 280 | 360 | 240 | 260 | 130 |
|  | Flexural load at break (kgf, No. 5 test specimen) |  | 26 | 25 | 25 | 27 | 30 | 27 | 23 | 15 |
|  | Line speed index |  | 245 | 225 | 205 | 175 | 100 | 195 | 185 | 265 |
|  | Sound absorption coefficient (NRC) |  | 0.75 | 0.75 | 0.70 | 0.60 | 0.48 | 0.72 | 0.59 | 0.70 |
|  | Pattern state (formation of vermicular pattern) |  | Good | Good | Good | Good | Nothing | Small | Too large | Too large |
|  | Fireproof properties |  | Quasi-noncombustible | Quasi-noncombustible | Quasi-noncombustible | Noncombustible | Noncombustible | Quasi-noncombustible | Noncombustible | Combustible |

As understood from the wet forming property and physical properties shown in Tables 1, 2 and 3, the thickness of the mat before expansion was ⅓ to ⅔ of the conventional one, so that the drainage was enhanced, resulting in an improvement in wet forming speed, and the water content of the mat before drying was greatly reduced to ⅓ to ⅔ of the conventional one, so that drying time is shortened and amount of fuel used is decreased. Accordingly, the line speed index in each of the Examples was 1.4 to 1.7 or more times those in the Comparative Examples which are representatives of the conventional general product, and this means that the productivities in the Examples were extremely superior to those in the Comparative Examples. Moreover, with respect to the physical properties, in Table 1, the density after drying is 190 to 300 kg/m$^3$, which achieves the target value of 200 to 300 kg/m$^3$, namely the object of lightening the weight of the mineral fiber panel, and the sound absorption coefficient is 0.59 to 0.75, from which a sufficient effect is also seen.

not less than 0.03 mm but less than 3.0 mm, the expansion degree of the above diameter being at least 3 times, and have an expansion-starting temperature of 50° to 105° C., to prepare a slurry, and thereafter subjecting the slurry to wet forming and then to drying.

2. The method according to claim 1, wherein the amount of the above thermally expansible resin fine particles is 0.5 to 7% by weight.

3. The method according to claim 1, wherein the diameter after expansion of the above thermally expansible resin fine particles is not less than 0.03 mm but less than 1.0 mm.

4. The method according to claim 1, wherein the above organic binder is a beaten pulp or a completely saponified polyvinyl alcohol.

5. The method according to claim 4, wherein the composition components are 70 to 90% by weight of a mineral fiber, 0.5 to 5% by weight of a beaten pulp, 1.5 to 8% by weight of a completely saponified polyvinyl alcohol, 1 to 10% by weight of an inorganic microfiber, 0.5 to 3% by weight of a flocculant and 0.5 to 6% by weight of thermally expansible resin fine particles which have a diameter after expansion of not less than 0.03 mm but less than 1.0 mm, the expansion degree of the above diameter being at least 3 times, and have an expansion-starting temperature of 50° to 105° C.

6. The method according to claim 2, wherein the diameter after expansion of the above thermally expansible resin fine particles is not less than 1.0 mm but less than 3.0 mm.

7. The method according to claim 2, wherein the diameter after expansion of the above thermally expansible resin fine particles is not less than 0.03 mm but less than 1.0 mm.

8. The method according to claim 2, wherein the above organic binder is a beaten pulp or a completely saponified polyvinyl alcohol.

* * * * *

UNITED STATES PATENT AND TRADEMARK OFFICE
CERTIFICATE OF CORRECTION

PATENT NO. : 5,800,676
DATED : September 1, 1998
INVENTOR(S) : Kazuyoshi KOIKE et al.

It is certified that error appears in the above-identified patent and that said Letters Patent is hereby corrected as shown below:

On the title page item 30:

Foreign Application Priority Data contains a typographical error wherein "Oct. 9, 1996 [JP] Japan 9-285875" should read --Oct. 9, 1996 [JP] Japan 8-285875--.

Signed and Sealed this

Twenty-fifth Day of May, 1999

*Attest:*

Q. TODD DICKINSON

*Attesting Officer*  *Acting Commissioner of Patents and Trademarks*